July 30, 1935.  F. J. BALL  2,009,867
TRELLIS AND PLANT PROTECTOR
Filed Nov. 9, 1933
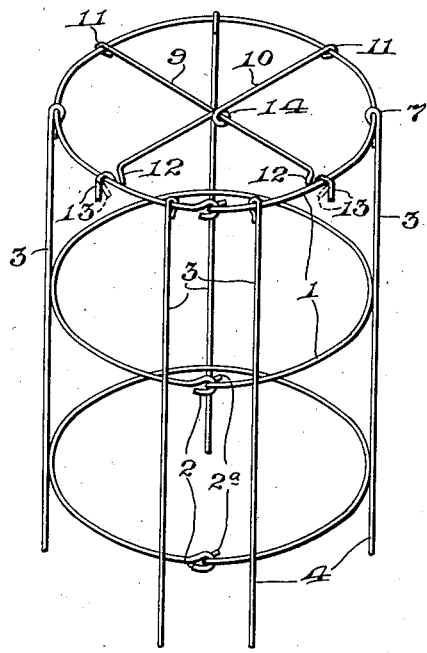
Fig. 1.
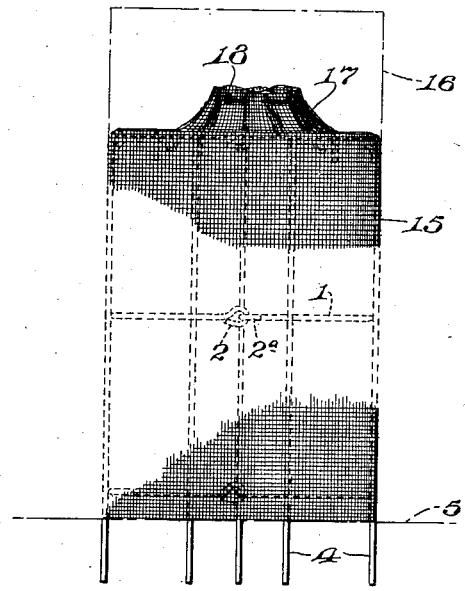
Fig. 2.
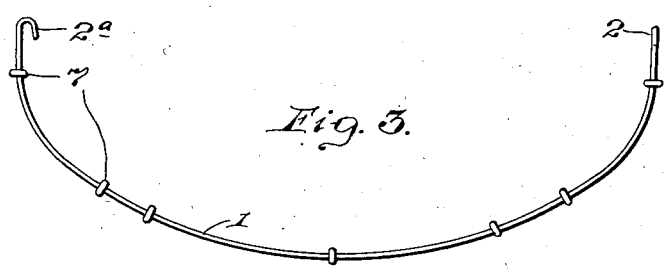
Fig. 3.
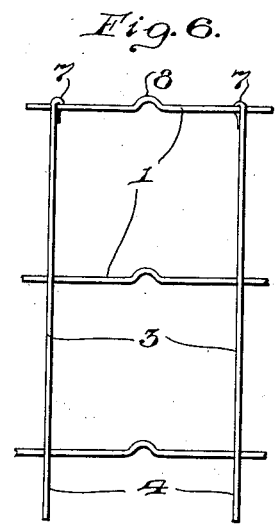
Fig. 6.
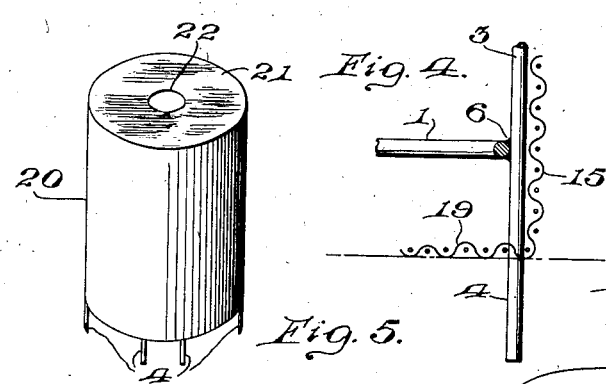
Fig. 4.
Fig. 5.
INVENTOR
Francis J. Ball,
BY
J. Stuart Freeman,
ATTORNEY

UNITED STATES PATENT OFFICE 2,009,867

TRELLIS AND PLANT PROTECTOR

Francis J. Ball, Willow Grove, Pa., assignor, by direct and mesne assignments, of one-third to Charles M. Biddle, 3d, Riverton, N. J., and one-third to D. P. Mitchell, Woodbury, N. J.

Application November 9, 1933, Serial No. 697,356

2 Claims. (Cl. 47—44)

The object of the invention is broadly to provide improvements in both protectors and trellises for plants, combined in one device which may be used equally well for either or both purposes simultaneously.

Another object is to provide a device of this type, which comprises a wire frame construction, such as can be dismantled when not in use as between seasons, nested one within another to conserve space for transportation and storage, and readily readjusted to operative arrangement whenever and wherever occasion may require.

A further object is to provide a device of this character, which can be of various sizes to conform to a wide range of types and sizes of plants, requiring artificial support during growth and bearing of fruit, and at the same time or independently of its supporting function can be covered with means to exclude destructive insects, while freely admitting air, light and water.

With these and other more specific objects in mind, the invention comprises further details of construction and operation, which are hereinafter fully brought out in the following description, when read in conjunction with the accompanying drawing, in which Fig. 1 is a perspective view of a trellis comprising one embodiment of the invention;

Fig. 2 is a side elevation of the same, covered with netting to comprise a protector for plants against insects;

Fig. 3 is a top plan view of the device in extended form for nesting, shipping and/or storage, and without the netting;

Fig. 4 is an enlarged fragmentary sectional view of a lower portion of the device, illustrating the method by which the netting is secured against rising from the ground when in use;

Fig. 5 is a perspective view of the improved frame covered with a paper bag or the like, for forcing purposes in cold or cool weather and to protect small seedlings and plants against the full rays of the sun in hot weather, yet permitting rain water and the like to enter into the inclosure; and Fig. 6 is a side elevation of the frame per se, provided with means to prevent the unrestricted movement of branches of plants supported thereby under the influence of the changing winds.

Referring to the drawing, there is provided a plurality of vertically spaced hollow elements 1, preferably formed of wire, the opposite ends 2 and 2ᵃ of which are adapted to interlock, as shown in Fig. 1. Circumferentially spaced around and secured in any suitable manner to each of said elements is a plurality of normally upright spacing members 3, which are preferably also formed of wire and extend freely beyond the lowermost element, to provide terminal pins or stake portions 4, which normally enter beneath the level of the ground line 5, operatively positioning the trellis, and preventing it from being blown over in a high wind, or being upset thru the weight and strain placed upon it by a developing or bearing plant.

The members 3 may be secured to the element 1 in each case by welding or the like, as shown at 6 in Fig. 4, or may be secured to any one or more of said elements by being looped around the same, as shown at 7, in Figs. 1, 3, and 6. Each of said elements in turn may be regularly curved as illustrated, or may be of any other geometric shape as desired, and preferably are provided with any desired number of looped, curved or corrugated portions 8, each of which is operative to prevent branches resting upon said elements from shifting laterally under the influence of changing winds.

The trellis thus described may by disengaging the normally interlocked end portions 2 of said elements be extended into substantially the shape shown in Fig. 3, to permit nesting of a plurality of such trellises, one within another for either or both transportation and storage between seasons. In any case, it has been found preferable to span the uppermost element by two or more crossed wire members 9 and 10 which at one end are preferably looped or otherwise pivotally secured at spaced points to the uppermost wire element, and at their other ends are provided with reversely curved offset portions 12 and flexible terminal portions 13, the space between said last-named portions being adapted to receive portions of said uppermost element substantially diametrically opposite to the point of pivotal support of said wire members, the said terminal portions being adapted to bend sufficiently about said uppermost element to prevent such last-named members from becoming accidentally disengaged therefrom, and said members being preferably in looped or other slidable inter-engagement at their central portions 14. By this construction, these crossed wire members normally comprise both a transverse structure for the trellis, and also additional means for supporting the upper branches of a plant, such for instance as the upper branches of a tomato vine or the like, while the curved elements 1 in turn support additional branches.

Referring to Fig. 2, the improved trellis is here shown as being covered by any suitable form of net 15, which is preferably substantially cylindrical in shape, and is provided with an upper end, which in the position indicated by the dot-and-dash lines 16, affords ready access to the interior of the trellis, but which end portion may be collapsed to form a closure 17, normally secured in operative position by any desired form of clamp, pin 18, or the like.

Referring to Fig. 4, it will be noted that the lower portion of the sides of the net cover 15 are preferably turned inwardly to form a ground-contacting section 19, pierced by the stake ends 4 of said supporting member 3, and serving to minimize the entrance into the trellis of those insects which tend to crawl instead of fly.

Referring to Fig. 5, the trellis is shown as being substantially or entirely covered by an inverted bag or the like 20, of paper, or other suitable form of light-diffusing material, operative to prevent the direct rays of the sun upon an unusually hot day attacking and injuring the small plants, which in the early part of the season may be protected by the trellis, and also serve as a protection against cold winds and frosts even when the sun is not causing intense heat. At all times this cover 20 is provided thru its upper wall 21 with an opening 22, of any suitable size and position, but adapted at all times to permit the relatively free entrance of water and the like to plants within the trellis.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim and desire to protect by Letters Patent of the United States is:—

1. A trellis, consisting of a plurality of vertically spaced closed hollow elements, peripherally spaced means connecting and operatively spacing said elements, said means being extended to provide supporting means adapted to enter the ground to operatively position the trellis, and a light-diffusing covering for both the sides and the top of said trellis to protect plants from direct sun rays, the covering of said top being provided with an aperture for the free entrance of water from above.

2. A trellis, comprising vertically spaced flexible wire elements, each of which is adapted to have its opposite ends interlocked, peripherally spaced wire uprights secured to and operative to space said elements, and to afford means to secure the trellis to the ground in operative position, said elements being extendible to permit nesting of a plurality of trellises, and slidably interlocked wires, one end of each wire being connected to the uppermost of said elements, the opposite end of each wire being detachably connected to a substantially diametrically located portion of said uppermost element, and said last-named wires being collapsible into substantial parallelism when disengaged from said uppermost element and said elements are in extended position.

FRANCIS J. BALL.